(12) United States Patent  (10) Patent No.: US 8,221,624 B2
Dague (45) Date of Patent: Jul. 17, 2012

(54) FLOATING OIL RECOVERY SUPPRESSOR AND VISCOSITY ELEVATOR

(76) Inventor: Joseph Merle Dague, San Jose, CA (US)

( * ) Notice: Subject to any disclaimer, the term of this patent is extended or adjusted under 35 U.S.C. 154(b) by 0 days.

(21) Appl. No.: 13/111,934

(22) Filed: May 19, 2011

(65) Prior Publication Data

US 2012/0152817 A1 Jun. 21, 2012

Related U.S. Application Data

(60) Provisional application No. 61/459,651, filed on Dec. 16, 2010.

(51) Int. Cl.
*E02B 15/04* (2006.01)
*C02F 1/40* (2006.01)

(52) U.S. Cl. ..................... 210/242.3; 210/923

(58) Field of Classification Search ............... 210/242.3, 210/776, 923
See application file for complete search history.

(56) References Cited

U.S. PATENT DOCUMENTS

| | | | | |
|---|---|---|---|---|
| 3,447,683 A * | 6/1969 | Luce, Jr. | ...................... | 210/776 |
| 3,637,080 A * | 1/1972 | Markel | ....................... | 210/769 |
| 3,666,100 A * | 5/1972 | Madej | ........................... | 210/800 |
| 3,667,610 A * | 6/1972 | Daniel | ........................ | 210/242.3 |
| 3,682,316 A * | 8/1972 | Waren | ........................ | 210/242.3 |
| 3,752,317 A * | 8/1973 | Lithen | ........................ | 210/242.3 |
| 3,800,951 A * | 4/1974 | Mourlon et al. | ........... | 210/242.3 |
| 3,817,385 A * | 6/1974 | Bergman | ................... | 210/242.3 |
| 3,959,136 A * | 5/1976 | Ayers et al. | .................... | 210/776 |
| 3,968,041 A * | 7/1976 | De Voss | ..................... | 210/242.3 |
| 3,992,292 A * | 11/1976 | Grimes et al. | ................ | 210/671 |
| 4,136,008 A * | 1/1979 | Pogonowski et al. | ......... | 210/776 |
| 5,160,638 A * | 11/1992 | Petkovic | ....................... | 210/776 |
| 5,254,266 A * | 10/1993 | Barnes et al. | ................. | 210/776 |
| 5,384,043 A * | 1/1995 | Bianchi et al. | ............. | 210/242.3 |
| 5,792,350 A * | 8/1998 | Sorley et al. | ............... | 210/242.3 |
| 6,471,862 B1 * | 10/2002 | Rockwell | .................... | 210/242.3 |
| 2011/0116869 A1 * | 5/2011 | Crouse | ........................... | 405/63 |

FOREIGN PATENT DOCUMENTS

EP 73365 A1 * 3/1983

* cited by examiner

*Primary Examiner* — Fred Prince
(74) *Attorney, Agent, or Firm* — Kenyon & Kenyon LLP

(57) ABSTRACT

A system for separating liquids of different densities employs a collector shell (17) made up of smooth lines and curvatures. A fairing creates and controls the flow of the liquids (for example water and oil) by gathering, capturing and isolating one liquid beneath the surface of the other liquid (24). The trapped and water pressurized oil is extracted and transferred to a storage container (21). One embodiment, the collector shell (17) is a simple design yet complex in achieving a workable shape that can accomplish all of the above using a small number of moving parts all of which, with the possible exception of the collector shell (17) and the elevator screw (12) are off the shelf items. The collector shell (17) inherently suppresses turbulence. The accumulation of oil captured in the collector bowl (17*d*) remains in a state of semi-suspension in both rough and normal surface conditions. The only movement of the oil is in a vertical direction when the elevator screw (12) is in motion.

5 Claims, 7 Drawing Sheets

SECTION B-B

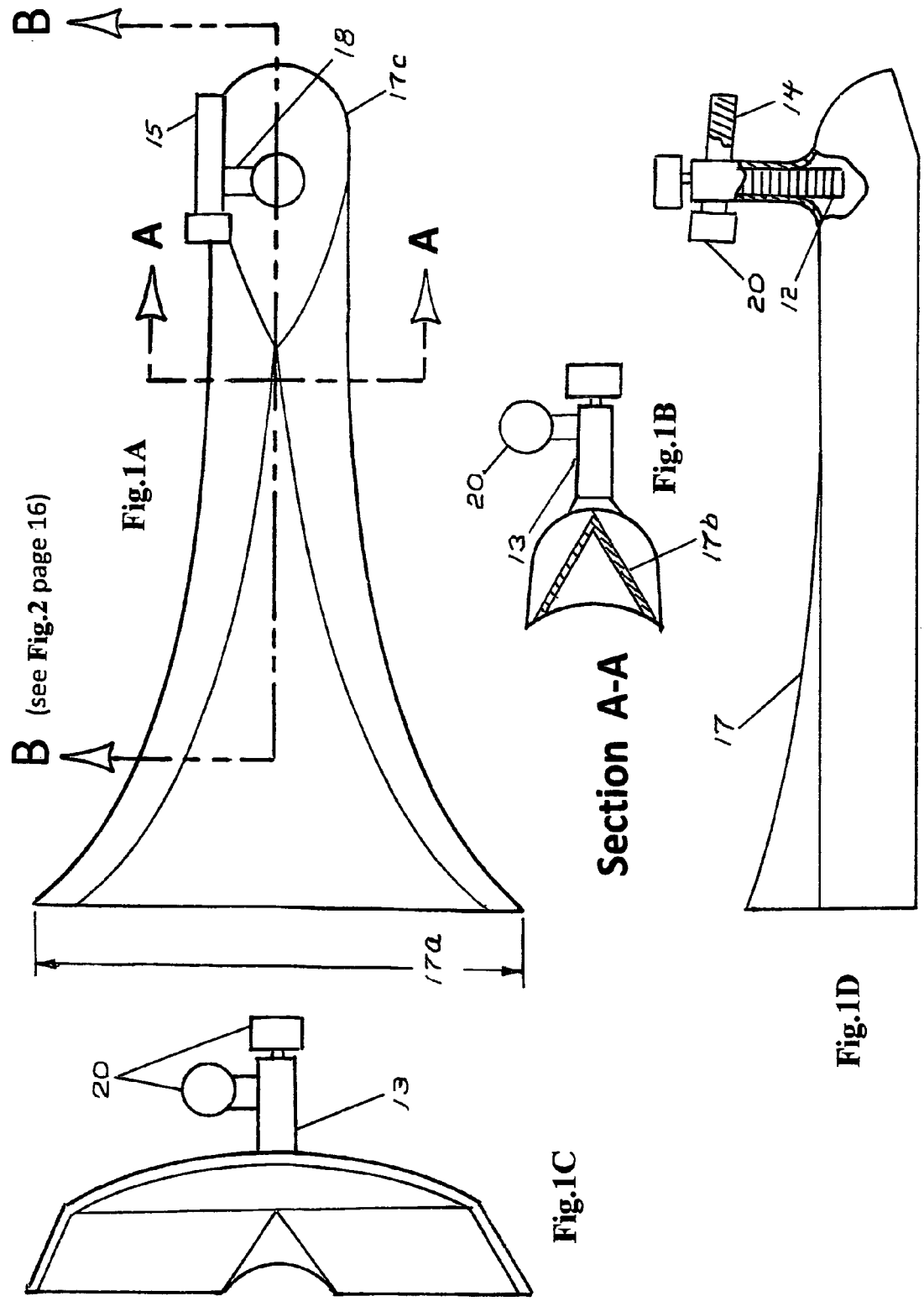

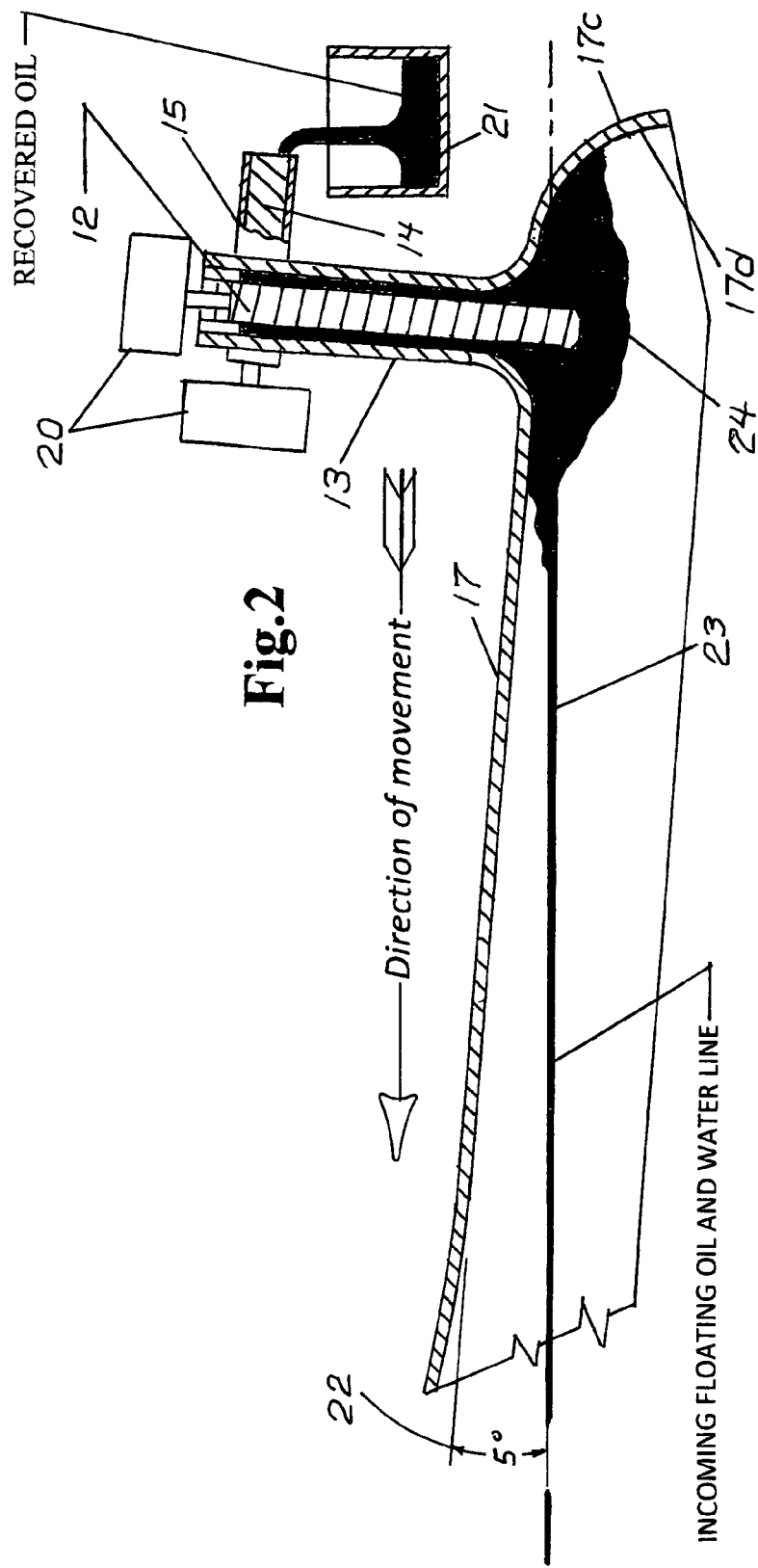

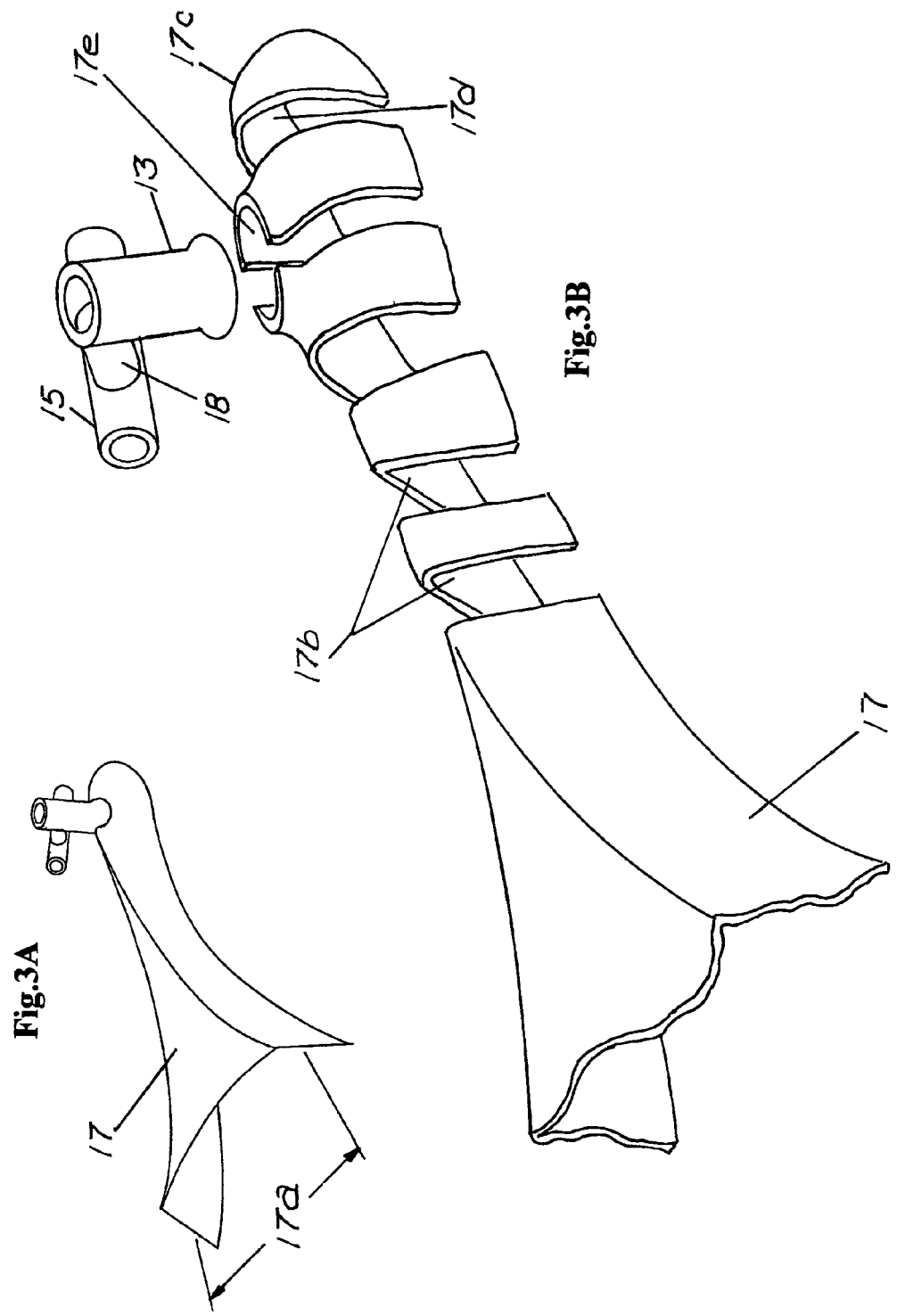

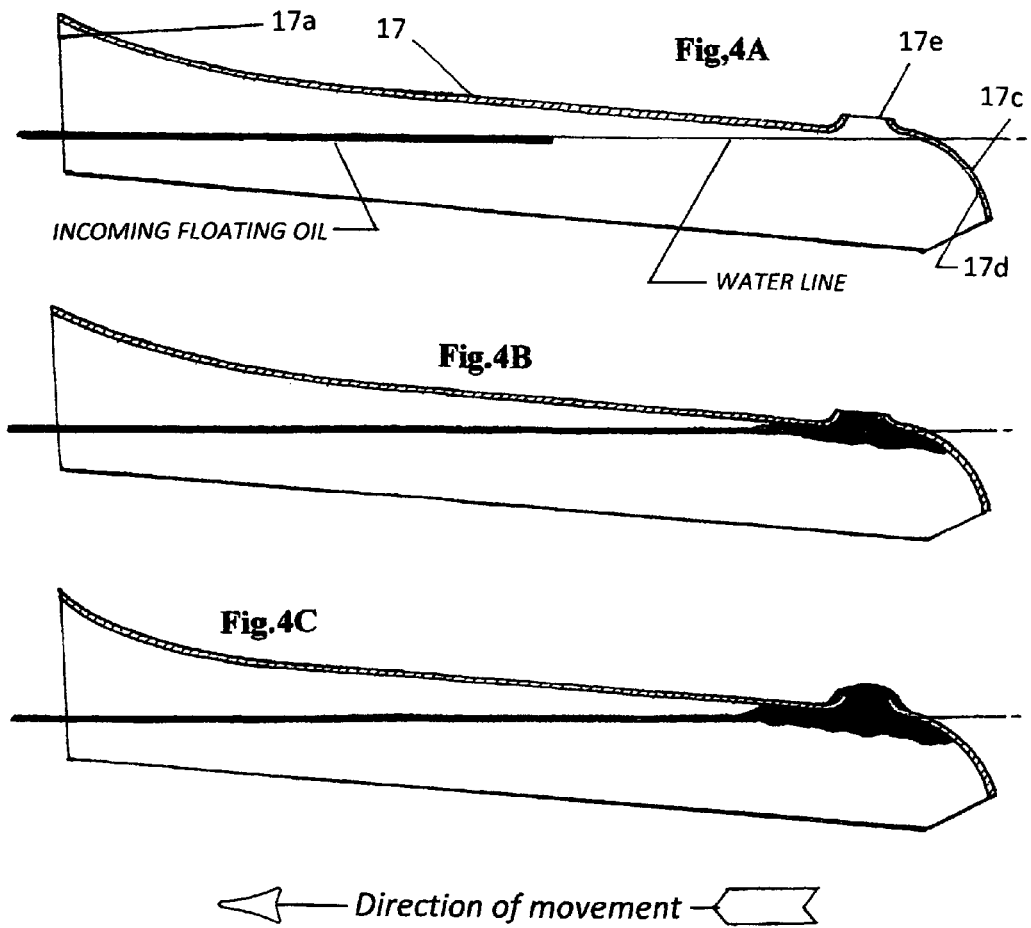

The above cross sections are the same as the cross sections depicted in Fig.2, section B-B. The three diagrams depict the flow of floating oil and how it is guided down and through the collector shell 17 and out through the circular opening 17c where the separation of water and oil take place without the aid of any other components.

Fig. 4A illustrates the oil entering the forward section of the collector shell 17a.

Fig.4B depicts the oil accumulating in the collector bowl 17d and being forced up into the circular opening 17e in the roof of the collector bowl 17d.

Fig. 4C depicts the flow of oil being forced up and out through the circular opening 17e and onto the surface of the collector shell 17.

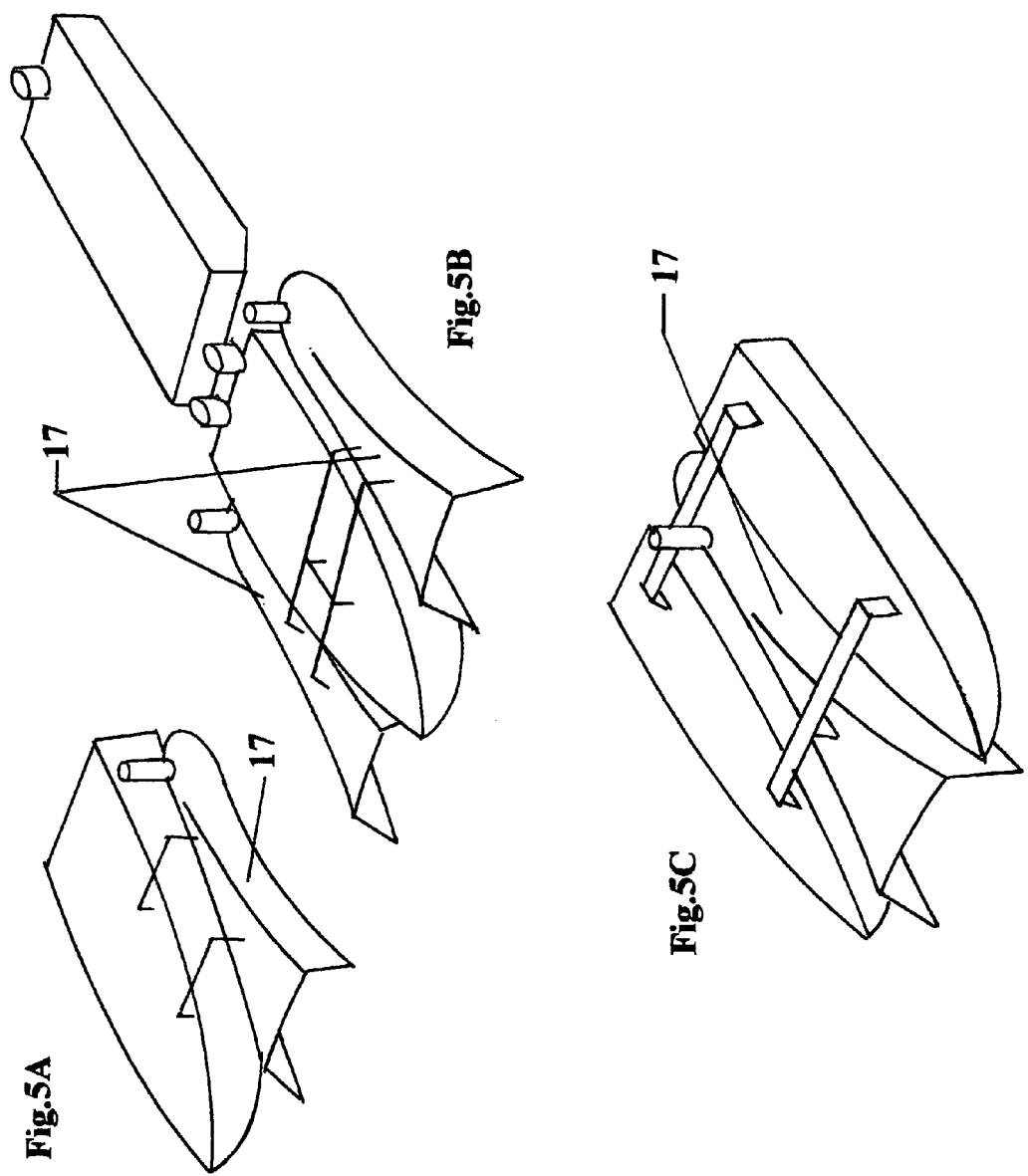

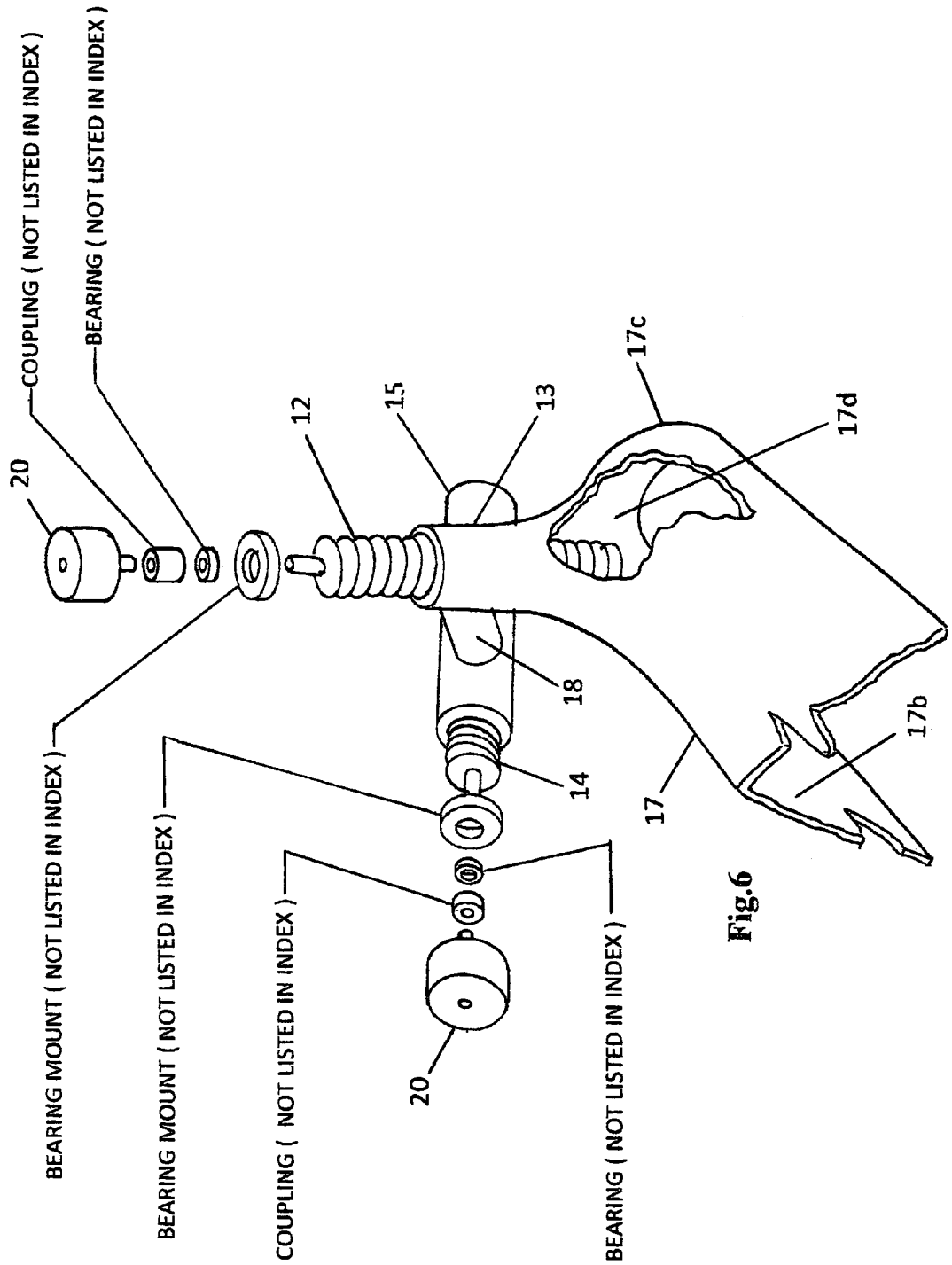

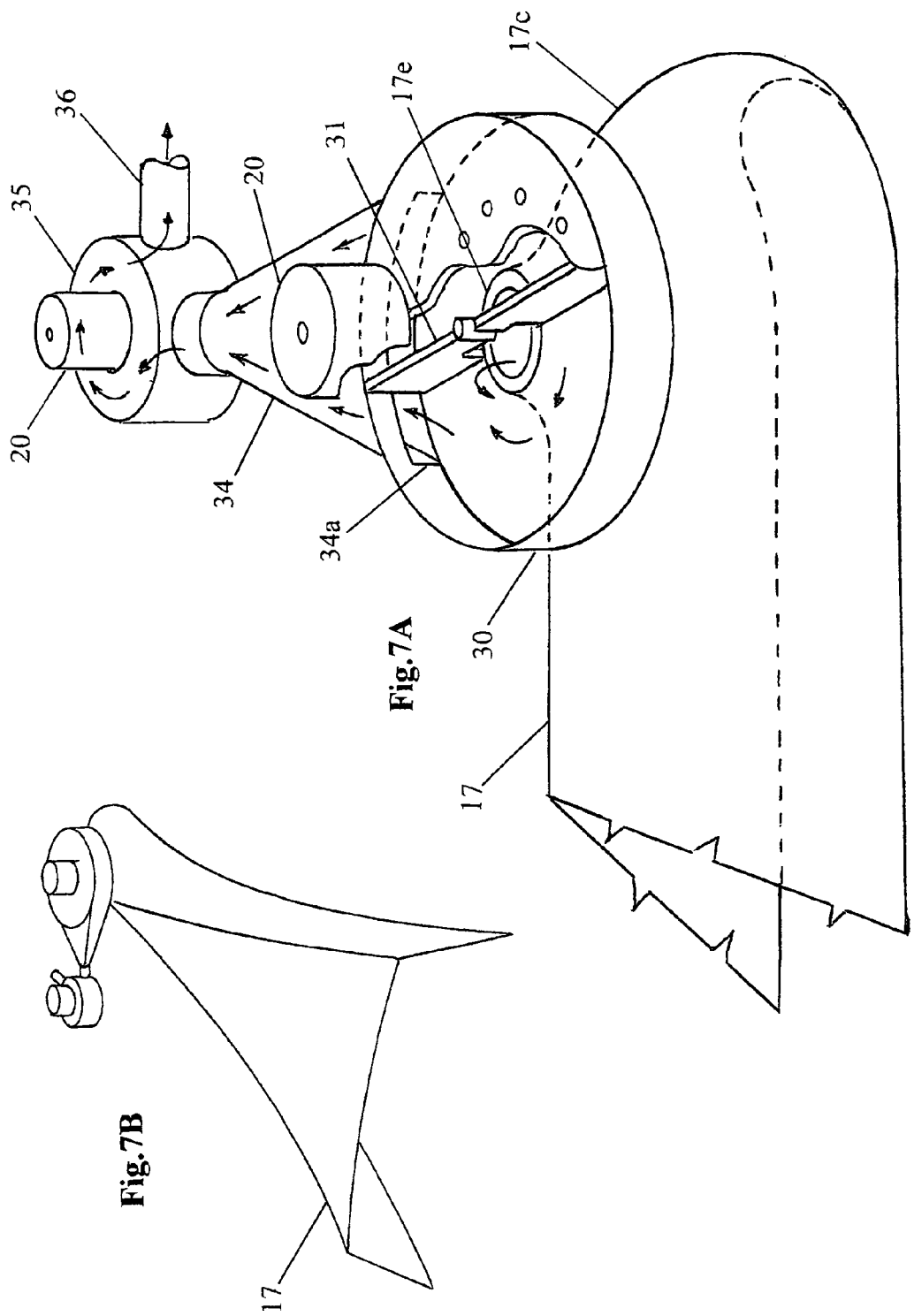

FLOATING OIL RECOVERY SUPPRESSOR AND VISCOSITY ELEVATOR

CROSS REFERENCE TO RELATED APPLICATIONS

This application claims the benefit of provisional patent application Ser. No. 61/459,651 filed Dec. 16, 2010 by the present inventor Joseph Merle Dague A patent search provided the following tabulation of some prior art that, with the exception of recovering oil from the surface of water, bears little relevancy to the apparatus put forth in this patent application.

| Patent no. | Date | Inventor |
|---|---|---|
| 3,643,804 | July 1972 | Sharpton |
| 3,700,108 | October 1972 | Richards |
| 4,456,536 | June 1984 | Lorenz |
| 5,753,108 | April 1998 | Haynes |
| 5,075,014 | December 1991 | Sullivan |

April twentieth, 2010: An offshore drilling rig exploded off the Louisiana coast releasing millions of gallons of crude oil a mile beneath the surface of the ocean. Nothing could be done to prevent or even curb the flow of oil. Once it reached the surface there was no way of preventing it from reaching the beaches. Faster and more scientific methods of recovering and removing crude oil from the ocean's surface once a spill has occurred are crucial to say the least.

PRIOR ART

A list of existing methods presently in use are as follows:

(a) The Spreaders and Gatherers: A comparatively small section of the oil spill is contained with floating booms. Once that is accomplished huge amounts of straw and/or a material called oleophilic, both of which oil will readily adhere to, are scattered over the boomed off surface of the water. The oil saturated material is then retrieved and hauled off somewhere on land and incinerated. This method is extremely slow, crude, messy and costly.

(b) The Skimmers: There are three types of skimmers. The rope mop skimmer, the weir skimmer and the drum skimmer. All three methods require aforementioned containment booms to be deployed as a vital part of their operation. All three methods mount their recovery equipment on vessels that remain stationary during the operation. The floating oil is drawn to the vessel by the action of the equipment. The rope mop method is a group of large oleophilic ropes that rotate through the water attaching oil which is then squeezed off into a container. The oil saturated ropes are also incinerated. This method is limited to deep water and is extraordinarily slow, messy and extremely costly. The weir skimmers function by allowing the oil floating on the surface of the water to flow over a weir where hopefully only oil will be collected. This method is limited to placid waters where very limited quantities of oil are collected. The drum skimmers function by using a rotating element such as a large floating drum which the floating oil adheres to. The oil is wiped from the surface of the drum into a container. The drum skimmer is also limited to calm water where limited amounts of oil are collected.

(c) The Centrifuge: After the aforementioned containment booms are deployed, oil and water is vacuumed and sucked into a floating hose opening that has to remain half open to water and half open to the floating oil. From there the water and oil are sucked into a centrifuge mounted on a stationary vessel. The water and oil are separated by centrifugal force. This method has had some success but is prone to jamming from the slightest form of floating debris and returns a considerable amount of oil back into the water. The process is comparatively faster than other methods but in the oceanographic spectrum of oil spills, recovering two hundred gallons of oil per minute and limited to very calm and boom protected waters is still far short of adequate.

(d) Chemicals: Putting chemical dispersants and/or microorganisms into the ocean is in and of itself the most questionable method in existence. Regardless of what claims are made of how non-toxic these detergents and bacteria are, it still changes the natural composition of the water and the environment of its inhabitants.

PRIOR ART SUMMARY

Even though the above mentioned methods are working to some extent, there is a tremendous amount of room for improvement as witnessed by the world after the Gulf spill. The prevailing methods presently in use are either extremely slow, messy to operate, totally lacking in mobility or are environmentally unhealthy; most are all of the above and come with a huge operational price tag.

Present state of the art oil spill clean up methods and equipment, even if multiplied hundreds of times, could not prevent another Gulf disaster if it happened today. Hundreds of thousands of gallons of un-reported crude oil is still floating free or trapped in marsh lands and remain un-recoverable. A myriad of flaws can be found among the limited number of oil spill recovery methods that are in existence. Two of the most significant drawbacks, which are inherent among all of them, are their total lack of expediency and mobility. The exceptions among them are the chemical and microorganism dispersant methods. In their case the oil is not recovered; it's mixed with chemical detergents and microorganisms and left in the ocean to react in a way that nobody is really sure of.

Advantages—First Embodiment (Note: from this point forward the "Floating Oil Suppressor and Viscosity Elevator" as a whole, will be referred to as the system)

Several advantages are as follows: A comparatively fast, comparatively clean, very economical and solely mechanical method of recovering and separating oil from water. The entire system including the vessel is completely mobile. As long as oil remains on the surface of the water during windy or rough seas it will be recovered by the system. The difference in relative density, viscosity, and/or specific gravity between water and oil and the configuration and continuous forward movement of a collector shell are factors that contribute to the overall function of the system. Other advantages of one or more aspects will be apparent from a consideration of illustrations and ensuing descriptions.

ILLUSTRATIONS—FIGURES

The illustrations are depicted as numerical figures from FIG. 1 through FIG. 7. Components within the illustrations are numerically listed from no. 12 through no. 21. Closely related components have the same number but different alphabetic suffixes. Operational characteristics of the system are listed as no. 23 and 24 and FIGS. 4A-4C.

FIGS. 1A-1D are orthographic illustrations of the front, top and side views of the assembled system, with FIG. 1B being a cross-sectional view of FIG. 1A showing the top. FIG. 1C being a front view of FIG. 1A and FIG. 1D being a side view of FIG. 1A.

FIG. 2 is an orthographic illustration of a cross sectional view of the system in the process of separating oil from water.

FIG. 3A is a perspective illustration of a collector shell and FIG. 3B is dissected view of FIG. 3A.

FIGS. 4A-4C are orthographic cross sections of the collector shell showing progressive separation of oil from water without the aid of other components.

FIG. 5A-5C are perspective reference illustrations depicting system mounting configurations on various types of vessels.

FIG. 6 is an exploded perspective illustration of the final assembly of the system.

FIGS. 7A and 7B are perspective illustrations of an alternative or secondary embodiment of the system. Components within the illustration are numerically listed from (30) through (36).

COMPONENT REFERENCE NUMBERS WITHIN THE LISTED ILLUSTRATIONS

12. Elevator screw
13. Elevator screw housing
14. Horizontal screw pump
15. Screw pump housing
16.
17. Collector shell
  17a. Floating oil and water intake
  17b. Inverted V-shaped corridor
  17c. Exterior end of collector shell
  17d. Collector bowl
  17e. Circular opening
18. Primary exhaust tube
19. Vent control—conventional ball valve—not shown
20. Hydraulic motor—conventional
21. Container for recovered oil—not proportional to illustration
22. Collector shell—angle of attack
23. Collector shell—incoming floating oil
24. Collector shell—captured oil and displacement of water
30. Recovery canister—$2^{nd}$ embodiment
31. Propeller—$2^{nd}$ embodiment
32. Perforated canister lid—$2^{nd}$ embodiment
34. Oil exhaust tubing—$2^{nd}$ embodiment
  34a. Rectangular aperture—$2^{nd}$ embodiment
35. Centrifugal pump (conventional)—$2^{nd}$ embodiment
36. Pump exhaust—$2^{nd}$ embodiment

DETAILED DESCRIPTION—FIRST EMBODIMENT

In one approach, the collector shell.17 may be in the shape of a hull having one side that is open and that, in operation, faces the surface of the liquid to be removed. Looking down on the entire body of the collector shell 17 embodiment in FIGS. 1A-1D from above is the appearance of a Y-shaped object not unlike that of an inverted or upside down ordinary household dustpan. The flared or wider end of collector shell 17 (dustpan) is the floating oil and water intake.17a.

The inverted Y-shape, or dustpan shape of the collector shell 17 should be such that it aids and encourages the funneling of oil and water into the system for separation. Other shapes, such as a funnel shape or a fan shape may also be used. Having a proximal end of the collector shell be wider than the distal end would help to achieve this goal. Even a shape such as that of an inverted boat hull, as noted earlier, may be used to good effect in implementing the invention. The collector shell 17 may be made of any suitable material. In one approach, the collector shell 17, is made of molded fiberglass, but many other materials from plastic, to metal, to carbon fiber among others, may be used to good effect, so long as the collector shell 17 retains sufficiently suitable flotation support. The collector shell 17 moves semi-submerged through the water in the direction of said flared end of the collector shell 17a. The handle of the figuratively described dustpan would be the radiused exterior end section of the collector shell.17c. Movement of the collector shell 17 may be accomplished in any known manner. Unlike other approaches which require the water-borne oil to come to the collector, in accordance with one aspect of the invention, the collector shell 17 comes to the water-borne oil thereby accelerating and facilitating the separation process.

In one approach, the entire collector shell 17 sits at approximately a five degree angle in the water (FIG. 2, no. 22) with the aft end of the collector shell 17c described as the handle of the dustpan, sitting, in one approach, about seventy five percent lower in the water than does the flared front end of the collector shell 17a. NOTE: From this point forward the words dustpan and handle will no longer be used to describe the collector shell 17 nor the similarities in appearance between the two. The continuous forward movement and downward angle of the collector shell 17 forces the accumulation of floating oil back and down through an inverted V-shaped corridor (FIG. 1 and FIG. 3, no. 17b); down below the surface of the water into what is, one approach, a spherically shaped semi-enclosed chamber called a collector bowl, FIG. 2, no. 17d located at an interior point (in one approach, the furthest interior point) aft of the flared end of the collector shell 17a. The lowest trailing edge of the spherical collector bowl 17d is the barrier that prevents the entrapped oil from escaping. The shape of the collector bowl 17d, combined with the lateral fairing of the collector shell 17 facilitates how the system can submerge, encapsulate and control the movement of the isolated oil regardless of conditions on the surface of the water up to and including what is known to ordinarily skilled artisans as * sea state 4. (small chops, defined direction, numerous white caps w/wind speed 13 to 18 mph). The displaced water in turn creates tremendous pressure on the accumulated submerged oil. The captured oil is forced up into a circular opening, (FIG. 3, no. 17e), in the roof of the collector bowl 17d. (See for example FIGS. 4A-4C) Attached to the aforementioned opening 17e and perpendicular to the horizontal body of the collector shell 17 is an elevator screw housing, FIG. 1, no. 13. At the same time the oil, under pressure from the displaced water beneath it, is being assisted in its upward movement, FIG. 2, no. 24 out of the collector bowl.17d by means of a conventional hydraulic motor, no. 20 and a powered elevator screw, 12. The rotating elevator screw 12 is mounted inside of the elevator screw housing 13. The elevator screw assembly (see FIG. 6) is not a pump. Because of density differences between oil and water, the slightest negative pressure or suction created by a pump would bring water to the forefront, resulting in emulsified water and oil. Rather the efficacy of the elevator screw 12 depends on the collective relationship among the inside diameter of the elevator screw housing 13, the outside diameter of the elevator screw 12, the pitch of the elevator screw 12 and the elevator screw RPM. The vicinity of the elevator screw assembly is where water and oil are separated, FIG. 2, no. 24. When the aforementioned components and functional elements cooperate appropriately in accordance with the invention, water will remain beneath the captured oil and the oil will be separated from the water and removed. It will be appreciated by ordinarily skilled artisans that different types of crude oil, with different densities, are extracted in different parts the world. Salinity, temperature and other factors affect water density. The aforementioned relationship among screw diameter, housing diameter and screw RPM can be varied, as known by ordinarily skilled artisans to promote efficiency and efficacy of oil removal.

The elevator screw 12 dimensions can be determined by using the following formula No. 1 with a constant 15° pitch with any diameter elevator screw. The clearance between the elevator screw 12 diameter and the inside diameter of the elevator screw housing 13 can be determined by using the following formula No. 2.

| No.1<br>Elevator screw (12) depth of flute | No.2<br>Elevator screw housing (13) wall clearance |
|---|---|
| d = elevator screw diameter<br>f = depth of flute (same as flute thickness)<br>r = core root diameter<br>$\sqrt{d} = \frac{b}{2} = (d-a) = f$<br>$d = (2 \times f) = r$ | d = elevator screw diameter<br>t = elevator screw housing inside diameter<br>c = clearance<br>$d \times 1.020 = t$<br>$\left(\frac{t-d}{2}\right) = c$ |

In one approach the top end of the elevator screw housing 13 may be open to normal outside air pressure to prevent negative air pressure or suction from within, again, preventing water from being brought to the forefront. The inside diameter of the elevator screw housing 13 may be considerably larger than the outside diameter of the elevator screw 12 thus enabling the viscous oil to be evacuated while the less viscous water remains behind or falls back through a gap between housing 13 and screw 12. The elevator screw 12 flute surface carrying the oil upward should rotate faster than the oil can drain off and fall down into the gap but not fast enough to cause the water to be sucked up or be considered a product of centrifugal force. Increasing elevator screw 12 RPM even by a couple of revolutions can force a substantial amount of the extracted oil, if not the majority, off of the screw flute and up against the inside wall of the elevator screw housing 13, thus preventing the elevation of just oil and allowing mostly water to be elevated resulting in emulsified water and oil. The majority of oil spill recovery systems rely on the adhering nature of oil and its ability to cling to almost any type of material surface. The clinging oil is subsequently wiped from the surface of the material and into a container. Adherence is not a requirement for efficacy of the present invention, because the screw itself, by its rotation, pulls the oil up from the surface of the water. The principle is not unlike what happens when drilling a hole in the ground using a conventional post hole digger.(auger) The very nature of the spiraling flute digs and forces new dirt being dug to force the old dirt above it up and out of the hole. The wall of the hole serves as a form of containment that tends to guide and keep the loose dirt going in an upward direction. The elevator screw 12 and the elevator screw housing 13 work on the same principle. Neither adherence nor centrifugal force is a factor is either case.

Detailed Description—First Embodiment (Continued)

The recovered oil is forced ever higher up into the elevator screw housing 13 by two primary forces among several forces taking place simultaneously within the elevator screw housing. First is the rotating elevator screw 12 and second is the continuous pressure from more oil being elevated into the elevator screw housing 13 from below.

At its highest elevated point the recovered oil is forced down, now aided by gravity, at a slight angle into and through a primary exhaust tube.18 which, in one approach, is horizontally affixed near the top of and slightly less than perpendicular to the elevator screw housing 13. The draining oil is then forced by incoming oil and gravity into the horizontal screw pump and screw pump housing.14 and 15. The screw pump housing 15 which is equipped with a conventional * ventilation control valve (not shown) is affixed to and perpendicular to the primary exhaust tube 18. Ventilation control prevents the pump from creating a suction that would draw the less viscous but heavier water up through the elevator screw system resulting in emulsified water and oil. The oil is then pumped into a separate container, 21 by means of a conventional hydraulic motor driven screw pump.14. Because of the clearance between the elevator screw 12 and the elevator screw housing 13 floating debris of limited size; seaweed, leaves, etc., is easily carried up with the oil and deposited in the same container 21 and filtered out at a later time.

Reversing the elevator screw 12 would clear out any debris that might jam the system. The inherent maneuverability in the system permits simply avoiding and/or working around larger debris such as logs, boards etc. There are numerous methods of collecting floating debris that would or could follow in close proximity to this recovery system. Most of those methods were employed long before oil spills became a problem. Although the system can function in both deep and shallow water including marsh lands, the primary purpose of the system is to recover floating oil from the ocean as quickly as possible before it becomes a beach problem. Encountering large or heavy debris at an open ocean spill site rarely if ever happens.

Additional Advantages—First Embodiment:

The system is comprised of a very limited number of moving parts all of which, with the possible exception of the collector shell 17 (which may be fabricated) and the elevator screw 12 (which may be specially configured), may be off the shelf items. The system does not use or disperse any type of absorbents, oil attaching materials or chemicals of any kind The operator of the system is never in direct contact with the oil before, during or after the recovery operation. There are no special skills required of the operator other than being able to operate a boat. There is a dire need and a tremendous market for this high speed, light weight, deep or shallow water oil spill recovery system. It is a simple, versatile design that lends itself to a myriad of sizes and vessel mounting configurations. (See FIG. 5A, 5B and 5C)

Deployment to any place on the globe is accomplished with comparative speed and ease. Another significant advantage is not having to deploy the aforementioned floating booms used to corral sections of the oil spill prior to recovery operations. Because of the system's inherent mobility it literally pursues the oil spill rather than remaining stationary and waiting for the oil to drift into or onto it.

Alternate Embodiment:

The collector shell 17 previously described in the first embodiment may be the same collector shell used in an alternate embodiment using a different method of containment. For more precise clarity relative to its function (FIG. 4A, 4B and 4C) as three cross sections of the collector shell illustrate the sequence in which the collector shell 17 is moving through the water and first encounters floating oil depicted in cross section sequence FIG. 4A. As the oil moves on through the collector shell 17 it gets trapped and accumulates in the collector bowl 17*d* depicted in cross section sequence FIG. 4B. As the amount of accumulated oil increases, the pressure from the displaced water also increases thereby forcing the oil up through and out of the circular opening 17*e* depicted in the last sequence FIG. 4C. The recovered oil literally spills out onto the upper surface of the collector shell 17 and will continue to do so as long as the collector shell 17 is moving forward and an adequate amount of oil is present. The sequence demonstrates that the collector shell 17 in and of itself separates the oil from the water without assistance from the other components. Without assistance the oil is, of course, un-containable. The alternate approach is depicted in FIG. 7A catching the separated oil in an enclosed cylindrical recovery canister 30 which may be affixed and sealed to the very top of the circular opening 17*e* located at the top rear end of the collector shell 17. A rotating propeller 31 is mounted inside the canister 30 and is affixed to the overhead surface of the hinged and perforated canister lid 32. (perforations in the canister lid allow ventilation to prevent aforementioned suction) The rotating propeller 31 (which may be a flat, pitch-less blade with a nominal clearance between the end of the blade and the inside wall of the canister 30 including a like clearance between the bottom and top of the blade and the floor and lid of the canister) is powered by a hydraulic motor 20 which is mounted on top of the canister lid 32. The rotating propeller 31 forces the incoming oil into a rectangular aperture 33 located on one side of the canister's interior wall. The open rectangular aperture 33 allows the forced oil into and through a length of rectangular tubing 34 and into a hydraulic motor 20 powered centrifugal pump 35. The recovered oil is ejected out of the pump exhaust tube 36 and thus into a container. (not shown)

Various modifications to the above embodiments will be apparent to ordinarily skilled artisans.

For example, the foregoing description said little about the mode of transportation of the inventive system through an oil spill, other than being attached, towed, or otherwise secured to a boat. Self-propelled embodiments are within the contemplation of the invention. For example, a possible remote—controlled, GPS guided system that could eliminate the need for human exposure to highly toxic, possibly lethal, methane gas fumes prevalent in all crude oil spills. Also, while the invention has been conceived and developed in the context of cleaning up environmentally dangerous oil spills, the invention has applicability in any situation in which liquid components of different viscosities need to be separated, and one or more of the components extracted.

The invention claimed is:

1. A mobile apparatus used in the separation of two liquid substances while moving across a surface of at least one of the two liquid substances, the apparatus comprising:
   a. a collector shell having a proximal end that is wider than a distal end, the shell being configured to gather, submerge, suppress, pressurize and harvest a liquid substance floating on the surface of a second, different liquid substance while the apparatus is moving across the surface of at least one of the two liquid substances, both a portion of the proximal end and a portion of the distal end being in contact with at least one of the two liquid substances while the apparatus is moving across the surface of at least one of the two liquid substances, wherein the two liquid substances have different viscosities, specific gravities, and/or densities, and wherein movement of the apparatus across the surface of at least one of the two liquid substances accomplishes the harvesting; and
   b. a motorized elevator system attached at the distal end of said apparatus to assist in the removal and storage of the first liquid substance, wherein the first liquid substance has at least one of the greater viscosity, lower specific gravity, and the lower density compared to the second liquid substance.

2. Apparatus as claimed in claim 1, wherein the apparatus is self-propelled.

3. Apparatus as claimed in claim 1, wherein the motorized elevator system comprises a screw and a screw housing surrounding the screw, the screw having a pitch, and a diameter relative to the screw housing, to facilitate the removal of the first liquid substance.

4. Apparatus as claimed in claim 1, wherein the motorized elevator system comprises a propeller and a propeller housing surrounding the propeller.

5. Apparatus as claimed in claim 1, wherein the collector shell has a shape selected from the group consisting of a funnel shape, a boat hull, a dustpan, a fan, and a flared shape.

* * * * *